United States Patent
Oda et al.

(10) Patent No.: US 12,442,989 B2
(45) Date of Patent: Oct. 14, 2025

(54) OPTICAL FIBER CABLE CONNECTION STRUCTURE AND METHOD FOR MANUFACTURING OPTICAL FIBER CABLE

(71) Applicant: Fujikura Ltd., Tokyo (JP)

(72) Inventors: Takuya Oda, Sakura (JP); Akito Nishimura, Sakura (JP)

(73) Assignee: Fujikura Ltd., Tokyo (JP)

(*) Notice: Subject to any disclaimer, the term of this patent is extended or adjusted under 35 U.S.C. 154(b) by 271 days.

(21) Appl. No.: 18/018,696

(22) PCT Filed: Aug. 6, 2021

(86) PCT No.: PCT/JP2021/029333
§ 371 (c)(1),
(2) Date: Jan. 30, 2023

(87) PCT Pub. No.: WO2022/123824
PCT Pub. Date: Jun. 16, 2022

(65) Prior Publication Data
US 2023/0296830 A1    Sep. 21, 2023

(30) Foreign Application Priority Data
Dec. 10, 2020 (JP) ................. 2020-205028

(51) Int. Cl.
*G02B 6/40* (2006.01)
*G02B 6/04* (2006.01)
*G02B 6/26* (2006.01)

(52) U.S. Cl.
CPC ............ *G02B 6/40* (2013.01); *G02B 6/04* (2013.01); *G02B 6/262* (2013.01)

(58) Field of Classification Search
CPC ...... G02B 6/02042; G02B 6/04; G02B 6/255; G02B 6/2555; G02B 6/262; G02B 6/264;
(Continued)

(56) References Cited

U.S. PATENT DOCUMENTS 6,775,446 B2* 8/2004 Henze ................ G02B 6/04
385/100
2003/0169972 A1 9/2003 Stanton
(Continued)

FOREIGN PATENT DOCUMENTS

JP     S51-65645 A     6/1976
JP     S56-092107 U    7/1981
(Continued)

OTHER PUBLICATIONS

Machine translation into English of JP-2019028334-A, 11 pages. (Year: 2019).*
(Continued)

*Primary Examiner* — Daniel Petkovsek
(74) *Attorney, Agent, or Firm* — Osha Bergman Watanabe & Burton LLP (57) ABSTRACT

An optical fiber cable connection structure includes: optical fibers divided into a first bundle and a second bundle in a middle portion of an optical fiber cable in a longitudinal direction of the optical fiber cable; a first fixing portion that integrally fixes the optical fibers of the first bundle in the middle portion; a second fixing portion that integrally fixes the optical fibers of the second bundle in the middle portion; and an optical path that is disposed between the first bundle and the second bundle, holds a space between the first bundle and the second bundle in the longitudinal direction, and optically connects the divided optical fibers to each other.

9 Claims, 8 Drawing Sheets

(58) Field of Classification Search
CPC .......... G02B 6/36; G02B 6/38; G02B 6/3801; G02B 6/3803; G02B 6/3861; G02B 6/40
See application file for complete search history.

(56) References Cited

U.S. PATENT DOCUMENTS

| | | | |
|---|---|---|---|
| 2004/0067025 A1* | 4/2004 | Haraguchi | G02B 6/4246 |
| | | | 385/88 |
| 2016/0154192 A1 | 6/2016 | Adouceur et al. | |
| 2018/0074268 A1* | 3/2018 | Morishima | G02B 6/3803 |
| 2019/0331861 A1* | 10/2019 | Shimakawa | G02B 6/403 |
| 2021/0124124 A1* | 4/2021 | Shimakawa | G02B 6/3518 |
| 2022/0026641 A1* | 1/2022 | Namekawa | G02B 6/40 |

FOREIGN PATENT DOCUMENTS

| | | | |
|---|---|---|---|
| JP | H09-90153 A | | 4/1997 |
| JP | 2019028334 A | * | 2/2019 |
| JP | 2020052133 A | | 4/2020 |
| WO | 2006/132098 A1 | | 12/2006 |
| WO | 2020/209364 A1 | | 10/2020 |

OTHER PUBLICATIONS

International Search Report issued in corresponding PCT Application No. PCT/JP2021/029333 mailed Oct. 6, 2021 (3 pages).

* cited by examiner

OPTICAL FIBER CABLE CONNECTION STRUCTURE AND METHOD FOR MANUFACTURING OPTICAL FIBER CABLE

BACKGROUND

Technical Field

The present invention relates to an optical fiber cable connection structure and a manufacturing method of an optical fiber cable.

Description of the Related Art

Patent Document 1 discloses a method for cutting a ferrule and multi-core optical fibers such that the ferrule is divided into two ferrule members in a state where the multi-core optical fibers are mounted on the ferrule. With such a method, positions of a plurality of cores of the multi-core optical fibers match on cut surfaces of the two ferrule members. Therefore, by abutting the cut surfaces of the two ferrule members, the multi-core optical fibers can be efficiently connected (in a short time) to each other.

PATENT DOCUMENT

Patent Document 1: JP No. 2020-052133

Even in an optical fiber cable including a plurality of optical fibers, it is required to efficiently (in a short time) connect one optical fiber cable to the other optical fiber cable, that is, to collectively connect the plurality of optical fibers. However, all of the plurality of optical fiber cables do not necessarily extend parallel to a longitudinal direction of one optical fiber cable, and may extend obliquely with respect to the longitudinal direction. Therefore, like the method of Patent Document 1, simply abutting the cut surfaces of the plurality of optical fibers after cutting the plurality of optical fibers of the optical fiber cable may allow some optical fibers (particularly, optical fiber extending obliquely) to be shifted at the abutted positions and not to be properly connected.

SUMMARY

One or more embodiments may provide an optical fiber cable connection structure capable of collectively connecting a plurality of optical fibers and a manufacturing method of an optical fiber cable.

An optical fiber cable connection structure according to one or more embodiments includes: a plurality of optical fibers divided into a first bundle and a second bundle in a middle portion of an optical fiber cable in a longitudinal direction; a first fixing portion that integrally fixes the plurality of optical fibers of the first bundle positioned in the middle portion; a second fixing portion that integrally fixes the plurality of optical fibers of the second bundle positioned in the middle portion; and an optical path disposed between the first bundle and the second bundle to hold a space between the first bundle and the second bundle in the longitudinal direction and optically connect the divided optical fibers to each other.

In the optical fiber cable connection structure, a space between the first bundle and the second bundle can be held at a space corresponding to the length of a shaving margin when the plurality of optical fibers are divided into the first bundle and the second bundle by the optical path. In addition, the optical path can optically connect the optical fiber of the first bundle and the optical fiber of the second bundle to each other. As a result, even if the optical fiber extends obliquely with respect to the longitudinal direction of the optical fiber cable, the optical fiber of the first bundle can be easily and properly connected to the optical fiber of the second bundle. Therefore, it is possible to collectively connect together the plurality of optical fibers of the optical fiber cable.

In the optical fiber cable connection structure, the optical path may be an optical resin having light transmissive properties and disposed on at least one of cut surfaces of the first bundle and the second bundle.

In the optical fiber cable connection structure, the optical path may be a plurality of self-assembled optical waveguides formed of a photocurable resin that individually connects the plurality of optical fibers, which are divided by extending from cut surfaces of the first bundle and the second bundle, to each other.

A method for manufacturing an optical fiber cable according to one or more embodiments includes: a fixing step of fixing a plurality of optical fibers with a resin to form a fixing portion in a middle portion of the optical fiber cable in a longitudinal direction; a dividing step of cutting the plurality of optical fibers in the fixing portion to divide the plurality of optical fibers into a first bundle and a second bundle; and a connecting step of optically connecting the optical fibers to each other, which are divided in the dividing step, in a state where a space between the first bundle and the second bundle is held at a space corresponding to the length of a shaving margin in the dividing step.

In the manufacturing method, in the connecting step, the optical fiber of the first bundle is optically connected to the optical fiber of the second bundle in a state where the space between the first bundle and the second bundle is held at the space corresponding to the length of the shaving margin. As a result, even if the optical fiber extends obliquely with respect to the longitudinal direction of the optical fiber cable, the optical fiber of the first bundle can be easily and properly connected to the optical fiber of the second bundle. Therefore, it is possible to collectively connect together the plurality of optical fibers of the optical fiber cable.

In the manufacturing method, in the connecting step, an optical resin having light transmissive properties may be disposed on at least one of cut surfaces of the first bundle and the second bundle, and the thickness of the optical resin interposed between the cut surface of the first bundle and the cut surface of the second bundle may correspond to the length of the shaving margin.

In the manufacturing method, in the connecting step, a portion between the first bundle and the second bundle may be filled with a photocurable resin in a state where the space between the first bundle and the second bundle is held at the space corresponding to the length of the shaving margin, and a self-assembled optical waveguide that connects together the optical fiber of the first bundle and the optical fiber of the second bundle may be formed by allowing light to pass through at least one of the optical fibers of the first bundle and the second bundle and launching the light toward the photocurable resin to cure the photocurable resin by the light.

In the manufacturing method, in the fixing step, the fixing portion may be formed by accommodating the middle portion in a case and injecting the resin into the case, in the dividing step, the case may be divided into a first case divided body integrally fixed to the first bundle and a second case divided body integrally fixed to the second bundle by cutting the case together with the plurality of optical fibers, and in the connecting step, the divided optical fibers may be positioned relative to each other by positioning the first case divided body and the second case divided body relative to each other.

According to one or more embodiments, it is possible to collectively connect together the plurality of optical fibers of the optical fiber cable.

DESCRIPTION OF THE EMBODIMENTS

First Example

Hereinafter, a first example of the present invention will be described with reference to FIGS. 1 to 8.

Figure 1:
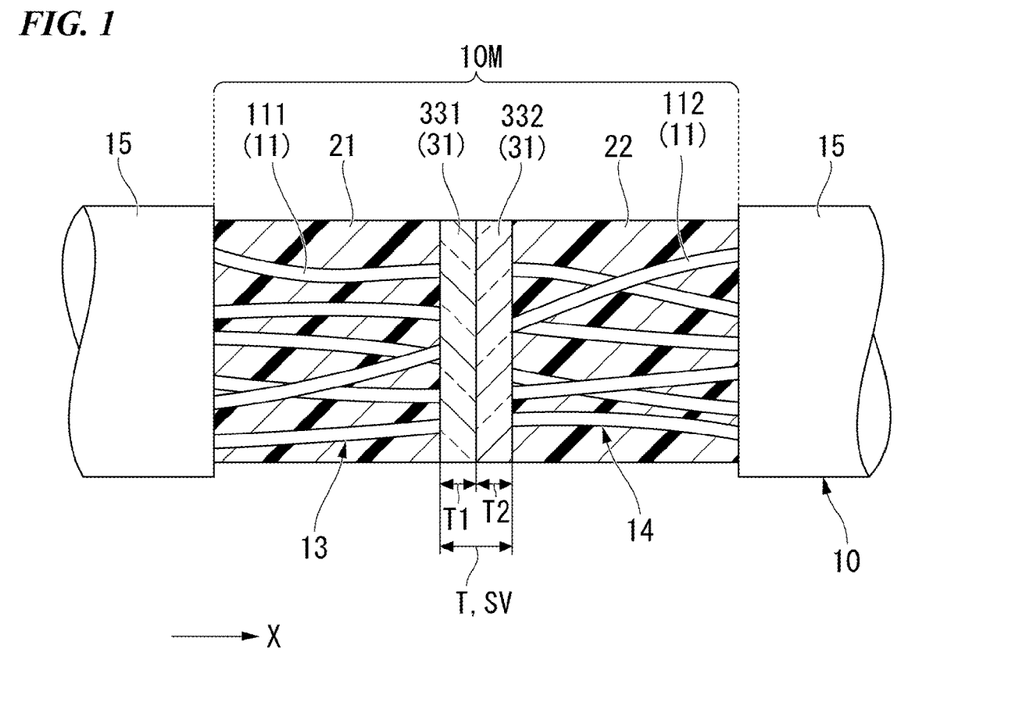
FIG. 1 is a view schematically showing a state of an optical fiber cable connection structure according to one or more embodiments, in which an optical fiber cable is connected.
Figure 2:
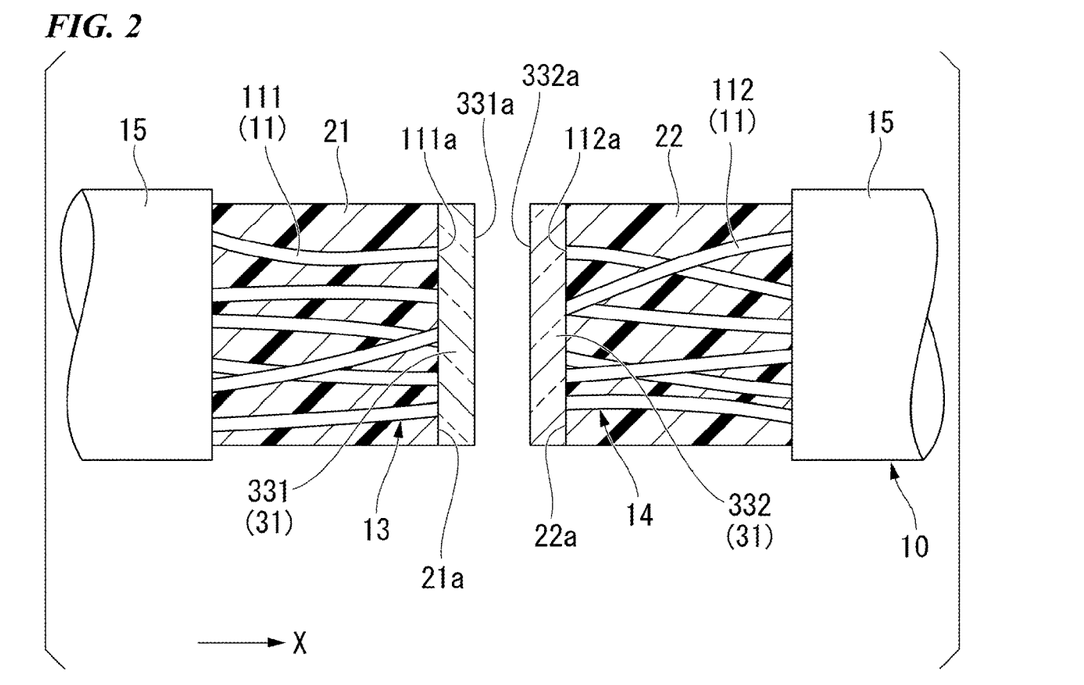
FIG. 2 is a view schematically showing a state of the optical fiber cable connection structure in FIG. 1, in which the optical fiber cable is disconnected.

As shown in FIGS. 1 and 2, an optical fiber cable connection structure of the first example includes an optical fiber cable 10 divided at a middle portion 10M in a longitudinal direction thereof, a first resin portion 21 (first fixing portion), a second resin portion 22 (second fixing portion), and an optical path 31. In the following description, the longitudinal direction of the optical fiber cable 10 is called an axial direction X.

The optical fiber cable 10 has a plurality of optical fibers 11 divided into a first bundle 13 and a second bundle 14 in the middle portion 10M. The plurality of optical fibers 11 are covered with a sheath 15 except for the middle portion 10M of the optical fiber cable 10. That is, the plurality of optical fibers 11 are exposed from the sheath 15 at the middle portion 10M of the optical fiber cable 10.

The first resin portion 21 integrally fixes a plurality of optical fibers 111 (hereinafter referred to as first optical fibers 111) of the first bundle 13 positioned at the middle portion 10M. At an end surface 21a of the first resin portion 21 in the axial direction X, cut surfaces 111a of the first bundle 13 (a plurality of first optical fibers 111) are exposed. The cut surfaces 111a of the first bundle 13 refer to surfaces that appear by dividing the plurality of optical fibers 11 of the optical fiber cable 10.

The second resin portion 22 integrally fixes a plurality of optical fibers 112 (hereinafter referred to as second optical fibers 112) of the second bundle 14 positioned at the middle portion 10M. At an end surface 22a of the second resin portion 22 in the axial direction X, cut surfaces 112a of the second bundle 14 (a plurality of second optical fibers 112) are exposed. The cut surfaces 112a of the second bundle 14 refer to surfaces that appear by dividing the plurality of optical fibers 11 of the optical fiber cable 10.

In FIG. 1, the first and second resin portions 21 and 22 are formed such that the plurality of first optical fibers 111 are embedded in the first resin portion 21 and the plurality of second optical fibers 112 are embedded in the second resin portion 22, but the present invention is not limited thereto.

The optical path 31 is disposed between the first bundle 13 and the second bundle 14 to hold (or maintain) a space between the first bundle 13 and the second bundle 14 in the axial direction X at a predetermined distance. The predetermined distance refers to a shaving margin SV (see FIGS. 5 and 7) of the optical fiber 11 (optical fiber cable 10) shaved when the plurality of optical fibers 11 are cut in the axial direction X.

In addition, the optical path 31 optically connects the divided optical fibers 11 to each other. Specifically, the optical path 31 individually and optically connects together the plurality of first optical fibers 111 and the plurality of second optical fibers 112.

The optical path 31 of the one or more embodiments includes optical resins 331 and 332. The optical resins 331 and 332 are resins having light transmissive properties. The optical resins 331 and 332 are preferably resins in which incident light is not scattered or which have less light scattering. When the optical resins 331 and 332 are resins that do not contain fillers, light scattering can be effectively suppressed. In addition, the optical resins 331 and 332 may be cured liquid resins, film-like resins, or viscous liquid resins. When a film-like resin is used for the optical resins 331 and 332, a thickness (film thickness) of the optical resins 331 and 332 can be easily and uniformly kept. Examples of specific materials for the optical resins 331 and 332 include epoxy-based materials, acrylic-based materials, polyimide-based materials, silicone-based materials, and organic/inorganic hybrid materials.

The optical resin 331 is disposed on each of the cut surfaces 111a of the first bundle 13, and the optical resin 332 is disposed on each of the cut surfaces 112a of the second bundle 14. In one or more embodiments, the optical resin 331 (first optical resin 331) is disposed not only on the cut surfaces 111a of the first bundle 13, but also on the entire end surface 21a of the first resin portion 21 where the cut surfaces 111a of the first bundle 13 are exposed. That is, a single first optical resin 331 is disposed on the cut surfaces 111a of the plurality of first optical fibers 111. In addition, the optical resin 332 (second optical resin 332) is disposed not only on the cut surfaces 112a of the second bundle 14, but also on the entire end surface 22a of the second resin portion 22 where the cut surfaces 112a of the second bundle 14 are exposed. That is, a single second optical resin 332 is disposed on the cut surfaces 112a of the plurality of second optical fibers 112.

The first optical resin 331 may be disposed only on the cut surfaces 111a of the first bundle 13, for example, and may not be disposed on the end surface 21a of the first resin portion 21. Similarly, the second optical resin 332 may be disposed only on the cut surfaces 112a of the second bundle 14, for example, and may not be disposed on the end surface 22a of the second resin portion 22. That is, a plurality of optical resins 331 and 332 may be individually disposed on respective one of the cut surfaces 111a of the plurality of first optical fibers 111 and the cut surfaces 112a of the plurality of second optical fibers 112.

A thickness T of the optical resins 331 and 332 interposed between the cut surfaces 111a of the first bundle 13 and the cut surfaces 112a of the second bundle 14 in the axial direction X corresponds to the length of the shaving margin SV described above. That is, the sum of a thickness T1 of the first optical resin 331 disposed on the cut surfaces 111a of the first bundle 13 and a thickness T2 of the second optical resin 332 disposed on the cut surfaces 112a of the second bundle 14 corresponds to the length of the shaving margin SV.

A facing surface 331a of the first optical resin 331 and a facing surface 332a of the second optical resin 332, which face each other in the axial direction X, are formed to be in surface contact with each other. The facing surfaces 331a and 332a of the first and second optical resins 331 and 332 may be formed flat as in the shown example, but the present invention is not limited thereto.

The optical resins 331 and 332 are interposed between the cut surfaces 111a of the first bundle 13 and the cut surfaces 112a of the second bundle 14, such that a space between the first bundle 13 and the second bundle 14 in the axial direction X can be held. In addition, the optical resins 331 and 332 are interposed between the cut surfaces 111a of the first bundle 13 and the cut surfaces 112a of the second bundle 14, such that the optical resins 331 and 332 can optically connect the first optical fiber 111 and the second optical fiber 112 to each other.

Next, a manufacturing method of an optical fiber cable according to the first example will be described with reference to FIGS. 3 to 6.

Figure 3:
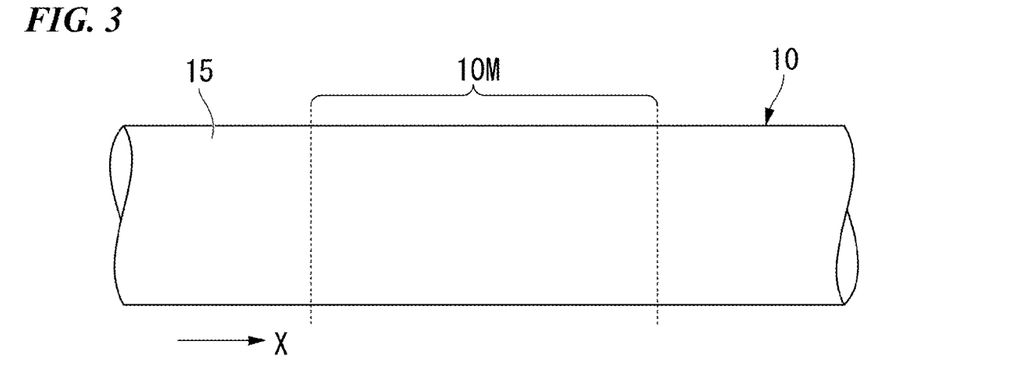
FIG. 3 is a view showing a manufacturing method of an optical fiber cable according to one or more embodiments.
Figure 4:
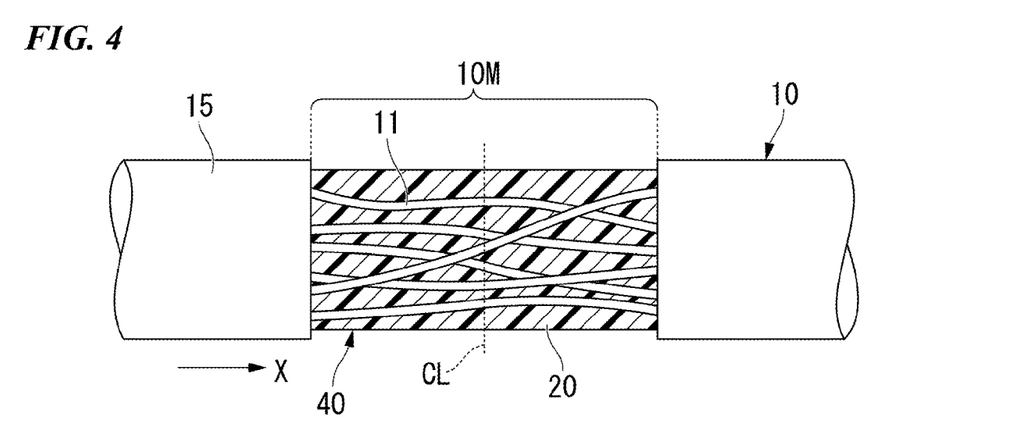
FIG. 4 is a view showing a step subsequent to FIG. 3.

In order to manufacture the optical fiber cable 10 having the connection structure shown in FIGS. 1 and 2, first, the sheath 15 positioned at the middle portion 10M of the optical fiber cable 10 in the axial direction X is removed as shown in FIGS. 3 and 4 (sheath removing step). As a result, the plurality of optical fibers 11 positioned in the middle portion 10M are exposed to the outside. The plurality of optical fibers 11 is not necessarily extending in the axial direction X, and may extend in an oblique direction with respect to the axial direction X.

Next, as shown in FIG. 4, the plurality of optical fibers 11 positioned in the middle portion 10M are solidified with a resin 20 to form a fixing portion 40 (fixing step). As a result, a position of each of the plurality of optical fibers 11 in the middle portion 10M is fixed with the resin 20.

In one or more embodiments, the resin 20 is used to fix the plurality of optical fibers 11, but the present invention is not limited thereto, and the plurality of optical fibers 11 may be fixed by tightening the plurality of optical fibers 11 with a spiral tube or a heat-shrinkable tube made of resin.

Figure 5:
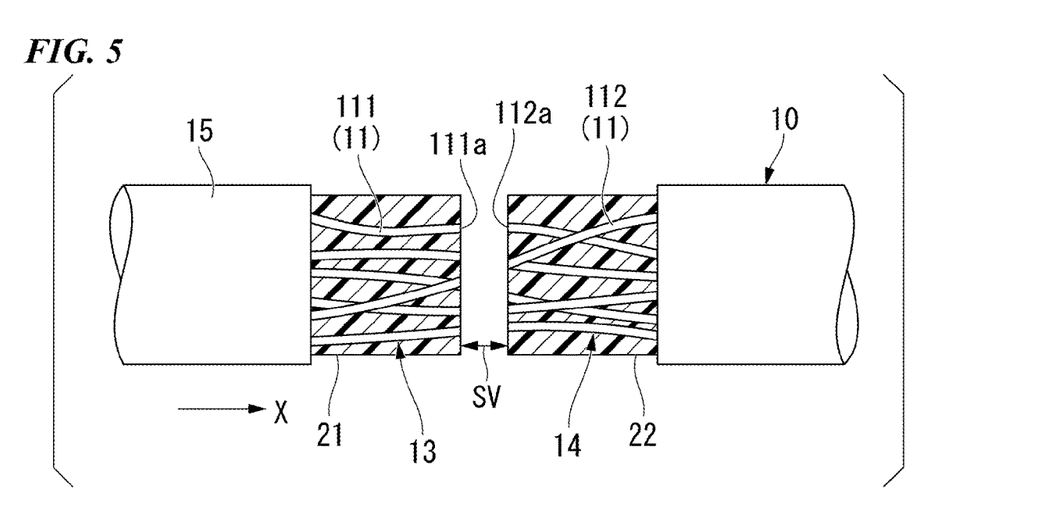
FIG. 5 is a view showing a step subsequent to FIG. 4.

Thereafter, as shown in FIGS. 4 and 5, the plurality of optical fibers 11 in the fixing portion 40 are cut to be divided into the first bundle 13 and the second bundle 14 (dividing step). In the dividing step, the resin 20 that fixes the plurality of optical fibers 11 is also cut to be divided into the first resin portion 21 and the second resin portion 22.

In the dividing step, the fixing portion 40 (the plurality of optical fibers 11 and the resin 20) is cut with a rotary blade, laser light, or the like. When the fixing portion 40 is cut, the fixing portion 40 is cut away by a predetermined length (shaving margin SV) in the axial direction X at a cutting position CL. The shaving margin SV depends on a thickness of the rotary blade, a size of a spot diameter of the laser light, or the like.

When the cut surfaces 111a and 112a of the divided first and second bundles 13 and 14 have chipping or the cut surfaces 111a and 112a have poor flatness, the cut surfaces 111a and 112a may be polished and smoothed. As a result, a decrease in splice loss of the optical fiber cable 10 can be suppressed or prevented.

In a state after the dividing step, the first bundle 13 (the plurality of first optical fibers 111) is fixed by the first resin portion 21, and the second bundle 14 (the plurality of second optical fibers 112) is fixed by the second resin portion 22. Therefore, positions of the plurality of first optical fibers 111 on the cut surfaces 111a of the first bundle 13 correspond to positions of the plurality of second optical fibers 112 on the cut surfaces 112a of the second bundle 14.

After the dividing step, as shown in FIG. 1, the divided plurality of first optical fibers 111 and plurality of second optical fibers 112 are optically connected to each other (connecting step). In the connecting step, the plurality of first optical fibers 111 and the plurality of second optical fibers 112 are connected to each other in a state where the space between the first bundle 13 and the second bundle 14 is held at a space corresponding to the length of the shaving margin SV generated in the dividing step.

Figure 6:
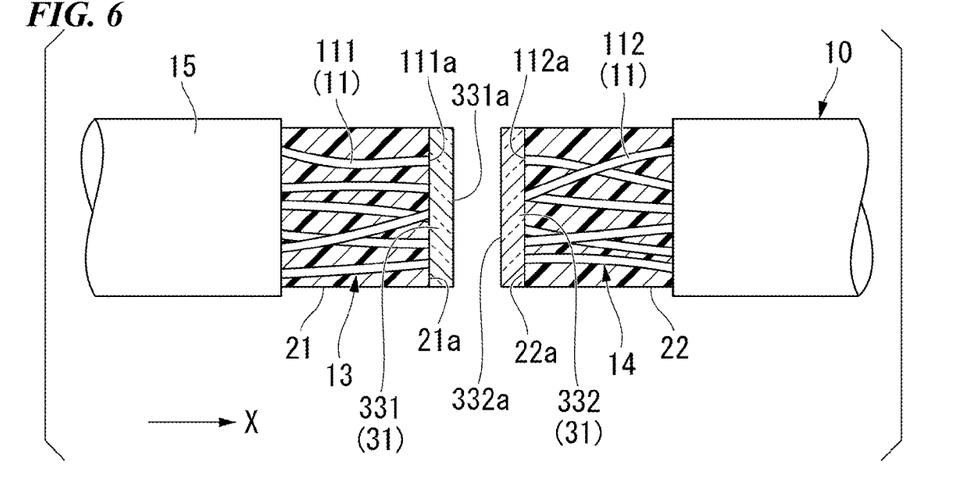
FIG. 6 is a view showing a step subsequent to FIG. 5.

In the connecting step of one or more embodiments, first, as shown in FIG. 6, the corresponding optical resins 331 and 332 are each disposed on the cut surfaces 111a of the first bundle 13 and the cut surfaces 112a of the second bundle 14. The optical resins 331 and 332 are resins in which incident light is not scattered or which have light transmissive properties with less light scattering. The optical resin 331 (first optical resin 331) is disposed not only on the cut surfaces 111a of the first bundle 13, but also on the entire end surface 21a of the first resin portion 21 where the cut surfaces 111a of the first bundle 13 are exposed. In addition, the optical resin 332 (second optical resin 332) is disposed not only on the cut surfaces 112a of the second bundle 14, but also on the entire end surface 22a of the second resin portion 22 where the cut surfaces 112a of the second bundle 14 are exposed. The thickness T1 of the first optical resin 331 and the thickness T2 of the second optical resin 332 in the axial direction X are set such that the thickness T, which is the sum of the thickness T1 and the thickness T2, corresponds to the length of the shaving margin SV (see FIG. 1). In addition, the facing surface 331a of the first optical resin 331 and a facing surface 332a of the second optical resin 332, which face each other in the axial direction X, are formed to be in surface contact with each other.

The thickness T (total thickness T) of the sum of the first and second optical resins 331 and 332 may match the length of the shaving margin SV, and may have, for example, an error of several percents with respect to the length of the shaving margin SV. In addition, the total thickness T may be set so as to correspond to the length of the shaving margin SV by taking into consideration that light launched from the cut surface 111a of the first optical fiber 111 or the cut surface 112a of the second optical fiber 112 to each of corresponding first and second optical resins 331 and 332, is scattered as it is separated from the cut surfaces 111a and 112a. Specifically, the total thickness T may be set to be shorter than the length of the shaving margin SV.

After the optical resins 331 and 332 are each disposed on the cut surfaces 111a and 112a of both the first bundle 13 and the second bundle 14, as shown in FIG. 1, the optical resins 331 and 332 are interposed between the cut surfaces 111a of the first bundle 13 and the cut surfaces 112a of the second bundle 14, thereby completing the connecting step. In a state where the optical resins 331 and 332 are interposed between the cut surfaces 111a of the first bundle 13 and the cut surfaces 112a of the second bundle 14, the space between the first bundle 13 and the second bundle 14 in the axial direction X is held by the optical resins 331 and 332 at a space corresponding to the length of the shaving margin SV. In addition, since the optical resins 331 and 332 are interposed between the cut surfaces 111a of the first bundle 13 and the cut surfaces 112a of the second bundle 14, the optical resins 331 and 332 optically connect the first optical fiber 111 and the second optical fiber 112 to each other.

By completing the connecting step described above, the manufacturing method of an optical fiber cable according to one or more embodiments is completed.

Figure 7:
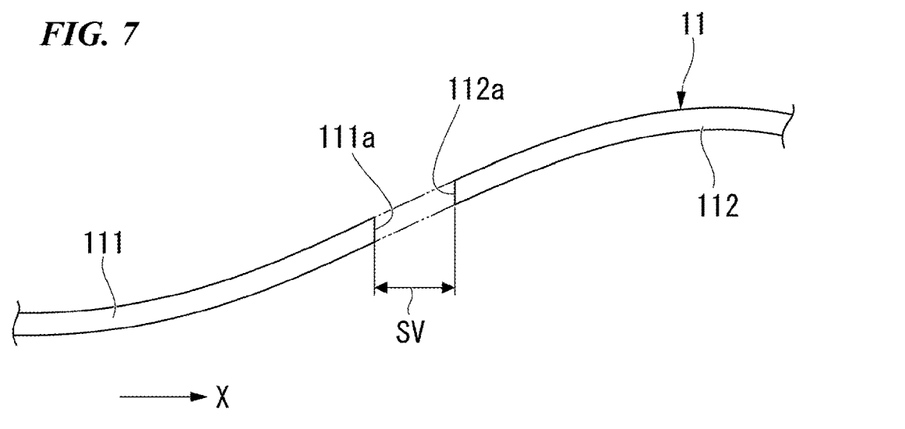
FIG. 7 is a view schematically showing a state where an optical fiber extends obliquely with respect to a longitudinal direction of the optical fiber cable according to one or more embodiments is cut.
Figure 8:
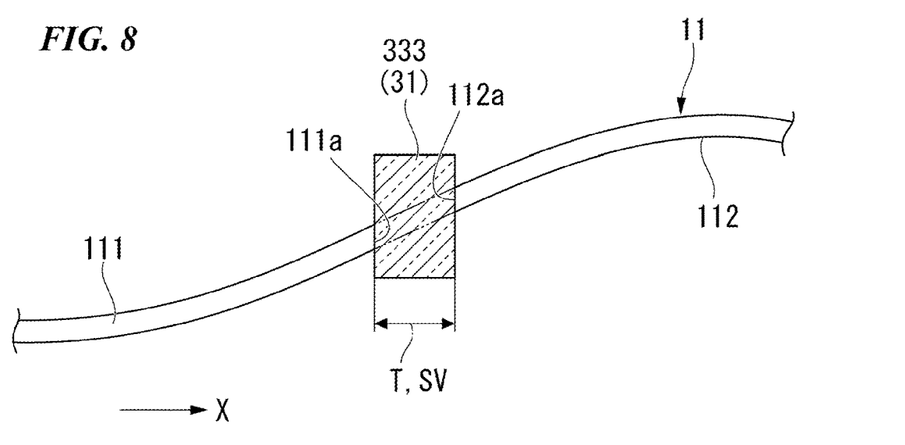
FIG. 8 is a view schematically showing a state where an optical resin is disposed between the cut optical fiber in FIG. 7.

As described above, in the connection structure and manufacturing method of an optical fiber cable of the first example, the space between the first bundle 13 and the second bundle 14 can be easily held at the space corresponding to the length of the shaving margin SV when the plurality of optical fibers 11 are cut to be divided into the first bundle 13 and the second bundle 14 by the optical resins 331 and 332 (optical path 31). Further, the optical resins 331 and 332 (optical path 31) can easily and optically connect together the first optical fiber 111 and the second optical fiber 112. As a result, for example, as shown in FIGS. 7 and 8, even if the optical fiber 11 extends obliquely with respect to the axial direction X, the divided first optical fiber 111 and second optical fiber 112 can be easily and properly connected to each other. Hereinafter, this point will be described.

For example, when an attempt is made to directly connect together the first optical fiber 111 that extends obliquely and the second optical fiber 112 without considering the shaving margin SV when the optical fiber 11 is cut, the cut surface 111a of the first optical fiber 111 and the cut surface 112a of the second optical fiber 112 are shifted from each other in a direction orthogonal to the axial direction X (vertical direction in FIG. 7). Therefore, the first optical fiber 111 is not properly connected to the second optical fiber 112.

On the other hand, in one or more embodiments, as shown in FIG. 8, an optical resin 333, which has a thickness T corresponding to the length of the shaving margin SV, is interposed between the cut surface 111a of the first optical fiber 111 and the cut surface 112a of the second optical fiber 112. As a result, light can be propagated in a direction in which the optical fiber 11 extends from the cut surface 111a of the first optical fiber 111 to the cut surface 112a of the second optical fiber 112 (direction in which the optical fiber 11 is inclined with respect to the axial direction X). That is, the first optical fiber 111 can be easily, properly optically connected to the second optical fiber 112.

The divided first optical fiber 111 and second optical fiber 112 can be easily and properly connected to each other, such that the plurality of optical fibers 11 of the optical fiber cable 10 can be collectively connected to each other.

By collectively connecting the plurality of optical fibers 11 of the optical fiber cable 10, for example, even if the elongated optical fiber cable 10 is wound and transported by being divided into a plurality of drums, the optical fiber cables 10 can be connected to each other in a short time at a site.

In addition, according to the optical fiber cable connection structure of one or more embodiments, a single optical resin 331 is disposed on the cut surfaces 111a of the plurality of first optical fibers 111 and a single optical resin 332 is disposed on the cut surfaces 112a of the plurality of second optical fibers 112. Accordingly, as compared with a case where the plurality of optical resins 331 are individually disposed on the respective one of the cut surfaces 111a of the plurality of first optical fibers 111 and the plurality of optical resins 332 are individually disposed on the respective one of the cut surfaces 112a of the plurality of second optical fibers 112, the optical resins 331 and 332 can easily obtain a uniform thickness between the plurality of first and second optical fibers 111 and 112.

In the first example, for example, the optical resin, which is the optical path 31, may be disposed on only one of the cut surfaces 111a of the first bundle 13 and the cut surfaces 112a of the second bundle 14. In this case, the optical resin disposed on one of the cut surfaces 111a of the first bundle 13 and the cut surfaces 112a of the second bundle 14 may be formed to be in surface contact with the other of the cut surfaces 111a of the first bundle 13 and the cut surfaces 112a of the second bundle 14.

Second Example

Next, a manufacturing method of an optical fiber cable according to a second example of the present invention will be described mainly with reference to FIGS. 9 to 13. In the following description, configurations in the description hereafter that are the same as those already described are given the same reference signs, and repeated descriptions thereof will be omitted.

In the manufacturing method of an optical fiber cable according to the second example, a fixing step, a dividing step, and a connecting step are implemented in order, as in the first example. In addition, a sheath removing step as in the first example is implemented before the fixing step.

Figure 9:
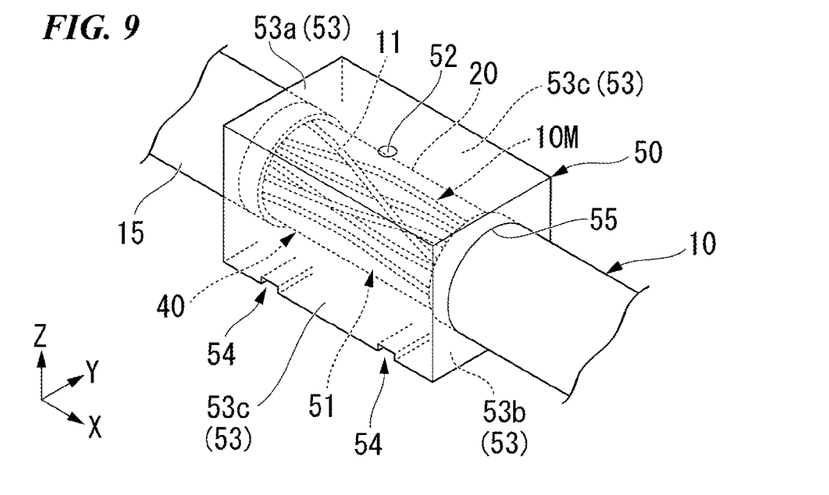
FIG. 9 is a view showing a manufacturing method of an optical fiber cable according to one or more embodiments.

In the fixing step of the second example, first, as shown in FIG. 9, the plurality of optical fibers 11 positioned at the middle portion 10M of the optical fiber cable 10 in the axial direction X are accommodated in a case 50.

An internal space 51 of the case 50, in which the plurality of optical fibers 11 positioned at the middle portion 10M is accommodated, has both ends open to the outside in the axial direction X. Such openings 55 of the case 50 are closed by the optical fiber cable 10 as the plurality of optical fibers 11 positioned at the middle portion 10M are accommodated. In addition, the internal space 51 of the case 50 is connected to a resin injection hole 52 that is open to the outside of the case 50. In FIG. 9, the internal space 51 of the case 50 is formed in a cylindrical shape, but the present invention is not limited thereto.

In addition, the case 50 of one or more embodiments has an appearance of a quadrangular prism shape (polygonal prism shape) with the axial direction X as a longitudinal direction. An outer surface of the case 50 includes four (a plurality of) flat surfaces 53 extending in the axial direction X. The four flat surfaces 53 are arranged around the internal space 51 based on an axis (not shown) along the axial direction X.

(Definition of Direction)

In one or more embodiments, a direction orthogonal to the axial direction X, in which two of the four flat surfaces 53 (upper surface 53a and lower surface 53b) extend is referred to as a vertical direction Z. In addition, a direction orthogonal to the axial direction X and the vertical direction Z, in which the other two of the four flat surfaces 53 (side surfaces 53c) extend is referred to as a horizontal direction Y.

The resin injection hole 52 is open to the upper surface 53a of the case 50. A groove 54 for positioning is formed in the lower surface 53b of the case 50. The groove 54 extends in the horizontal direction Y and is open to the both ends of the case 50 in the horizontal direction Y. Two grooves 54 are arranged side by side with a space in the axial direction X interposed therebetween. The resin injection hole 52 is positioned between the two grooves 54 in the axial direction X.

In the fixing step, after the plurality of optical fibers 11 are accommodated in the internal space 51 of the case 50, the liquid resin 20 is injected into (inside) the internal space 51 of the case 50 through the resin injection hole 52. The injected resin 20 is cured, such that a fixing portion 40 is formed by fixing the plurality of optical fibers 11 with the resin 20.

Figure 10:
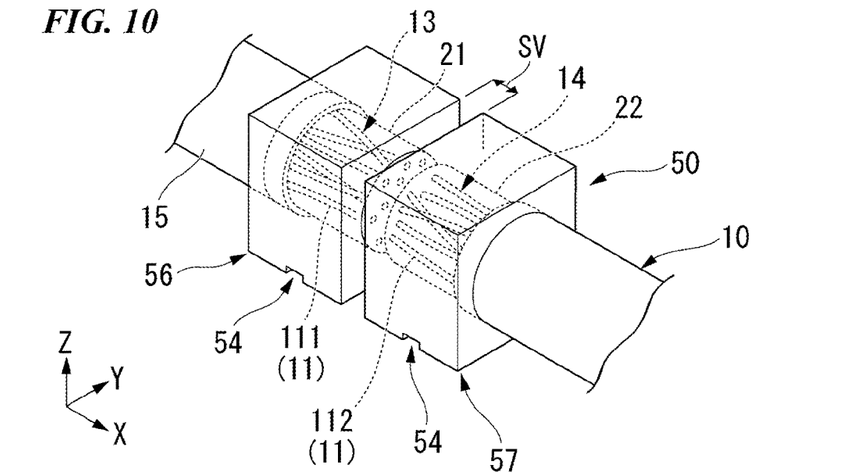
FIG. 10 is a view showing a step subsequent to FIG. 9.

In the dividing step of the second example, as shown in FIGS. 9 and 10, the case 50 is cut together with the plurality of optical fibers 11. As a result, the case 50 is divided into a first case divided body 56 and a second case divided body 57 arranged in the axial direction X. The first case divided body 56 is a part of the case 50 that is integrally fixed to the first bundle 13 by the first resin portion 21. On the other hand, the second case divided body 57 is a part of the case 50 that is integrally fixed to the second bundle 14 by the second resin portion 22. In the dividing step, as with the fixing portion 40 (the plurality of optical fibers 11 and the resin 20), the case 50 is cut away by a predetermined length (shaving margin SV) in the axial direction X at a cutting position.

Further, in the dividing step, the case 50 is cut between the two grooves 54. Therefore, each of the first and second case divided bodies 56 and 57 includes one groove 54. In addition, in one or more embodiments, the case 50 is cut such that the resin injection hole 52 is included in the shaving margin SV. Therefore, the resin injection hole 52 is not included in the first and second case divided bodies 56 and 57.

Figure 11:
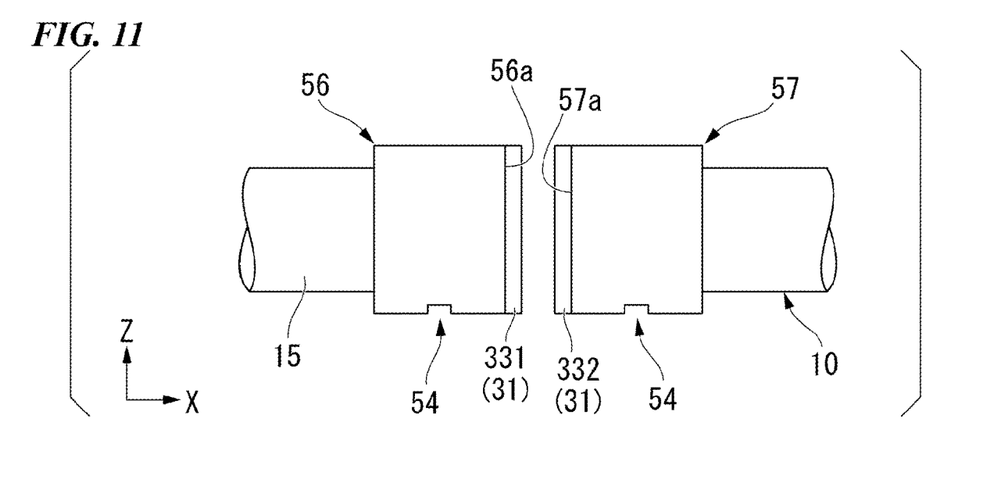
FIG. 11 is a view showing a step subsequent to FIG. 10.

In the connecting step of the second example, as in the first example, the optical resins 331 and 332 are each disposed on the cut surfaces 111a of the first bundle 13 and the cut surfaces 112a of the second bundle 14 (see FIG. 6). However, in the second example, as shown in FIG. 11, the optical resins 331 and 332 are also disposed on each of a cut surface 56a of the first case divided body 56 and a cut surface 57a of the second case divided body 57 corresponding to each of the cut surfaces 111a of the first bundle 13 of the optical resin 331 and the cut surfaces 112a of the second bundle 14 of the optical resin 332. The optical resins 331 and 332 may be disposed on only one of the cut surface 56a of the first case divided body 56 and the cut surface 57a of the second case divided body 57.

Figure 12:
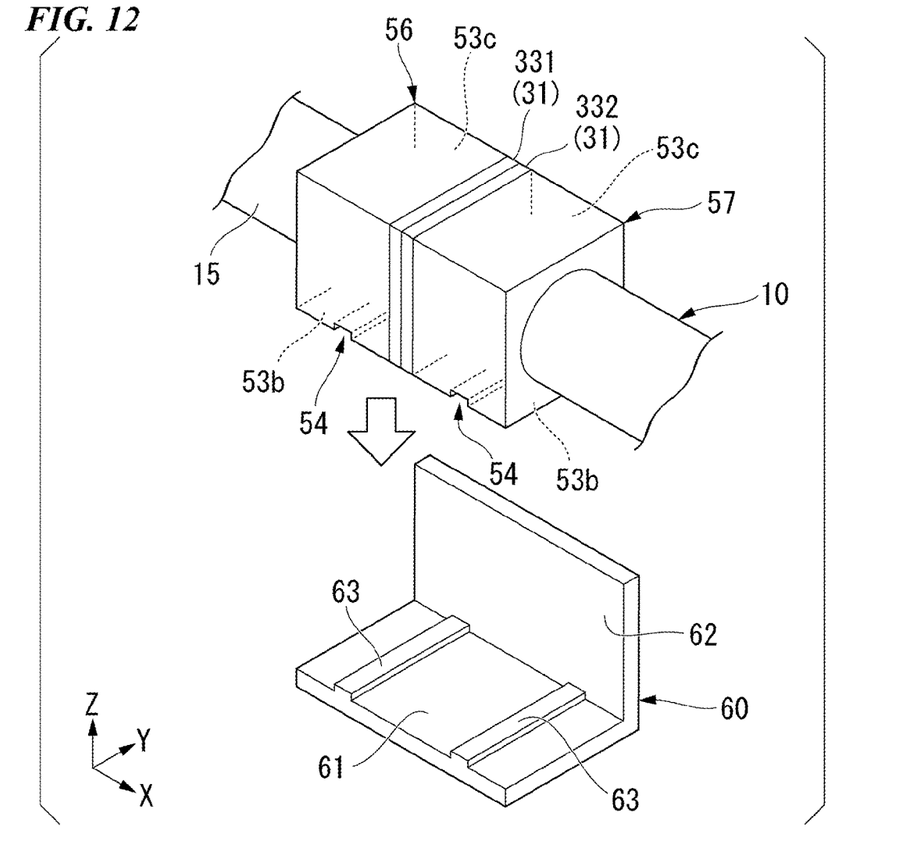
FIG. 12 is a view showing a step subsequent to FIG. 11.
Figure 13:
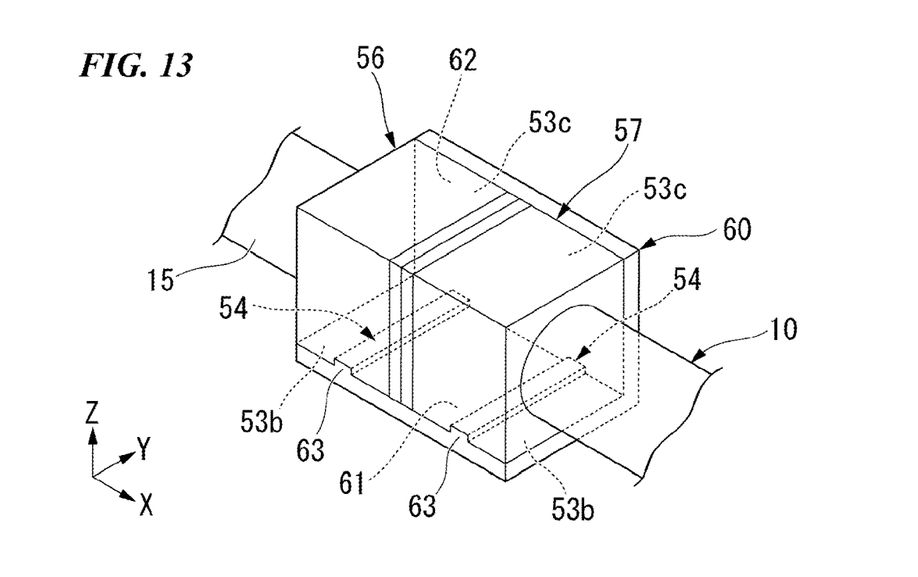
FIG. 13 is a view showing a step subsequent to FIG. 12.

Further, in the connecting step of the second example, as shown in FIGS. 12 and 13, the first case divided body 56 and the second case divided body 57 are positioned relative to each other such that the divided plurality of first optical fibers 111 and plurality of second optical fibers 112 (see FIG. 10) are positioned relative to each other.

Specifically, in the connecting step of the second example, a positioning jig 60 is prepared as shown in FIG. 12. The positioning jig 60 has two flat alignment surfaces 61 and 62 facing in different directions to each other. The relative positions of the two alignment surfaces 61 and 62 each correspond to the relative positions of the lower surfaces 53b and the side surfaces 53c of the first and second case divided bodies 56 and 57. In FIG. 12, the lower surfaces 53b of the first and second case divided bodies 56 and 57 and the first alignment surface 61 of the positioning jig 60 corresponding thereto are surfaces extending in the axial direction X and the horizontal direction Y. In addition, the side surfaces 53c of the first and second case divided bodies 56 and 57 and the second alignment surface 62 of the positioning jig 60 corresponding thereto are surfaces extending in the axial direction X and the vertical direction Z, and are orthogonal to the first alignment surface 61.

Furthermore, the first alignment surface 61 corresponding to the lower surfaces 53b of the first and second case divided bodies 56 and 57 is formed with positioning band-like protrusions 63. Two band-like protrusions 63 extend in the horizontal direction Y and are arranged side by side in the axial direction X with a space interposed therebetween, as in the grooves 54 of the first and second case divided bodies 56 and 57. The space between the two band-like protrusions 63 in the axial direction X corresponds to the space of the two grooves 54 (see FIG. 9) of the case 50 before cutting.

After the positioning jig 60 is prepared, as shown in FIG. 13, the lower surfaces 53b of the first and second case divided bodies 56 and 57 are in surface contact with the first alignment surface 61 of the positioning jig 60, and the side surfaces 53c of the first and second case divided bodies 56 and 57 are in surface contact with the second alignment surface 62 of the positioning jig 60. As a result, the first and second case divided bodies 56 and 57 are positioned relative to each other in a direction orthogonal to the axial direction X (horizontal direction Y or vertical direction Z). In addition, the first and second case divided bodies 56 and 57 are positioned relative to each other even in a rotation direction with the axial direction X as a center axis.

Furthermore, when the lower surfaces 53b of the first and second case divided bodies 56 and 57 are in surface contact with the first alignment surface 61, the two band-like protrusions 63 of the positioning jig 60 are each inserted into the grooves 54 of the first and second case divided bodies 56 and 57. As a result, the first and second case divided bodies 56 and 57 cannot move in the axial direction X with respect to the positioning jig 60, that is, the first and second case divided bodies 56 and 57 are positioned in the axial direction X.

As described above, the first and second case divided bodies 56 and 57 are positioned relative to each other such that the divided plurality of first optical fibers 111 and plurality of second optical fibers 112 (see FIG. 10) can be positioned relative to each other.

In a state where the plurality of first optical fibers 111 are positioned relative to the plurality of second optical fibers 112, as shown in FIG. 1 of the first example, the optical resins 331 and 332 are interposed between the cut surfaces 111a of the first bundle 13 and the cut surfaces 112a of the second bundle 14. As a result, the space between the first bundle 13 and the second bundle 14 in the axial direction X is held at the space corresponding to the length of the shaving margin SV by the optical resins 331 and 332. In addition, the first optical fiber 111 and the second optical fiber 112 are optically connected to each other by the optical resins 331 and 332.

As described above, by completing the connecting step, the manufacturing method of an optical fiber cable according to the second embodiment is completed.

According to the second example described above, the same effects as those of the first example are obtained.

In addition, in the manufacturing method of the optical fiber cable of the second example, in the fixing step, the plurality of optical fibers 11 are fixed by permeating the liquid resin 20 between the plurality of optical fibers 11, and then curing the resin 20.

Therefore, a relative positional relationship between the plurality of optical fibers 11 can be maintained more reliably. Accordingly, after the dividing step, it is possible to effectively suppress the shifting of the plurality of first optical fibers 111 from each other and the shifting of the plurality of second optical fibers 112 from each other.

In addition, according to the manufacturing method of an optical fiber cable of the second example, in the fixing step, the fixing portion 40 by which the plurality of optical fibers 11 are fixed with the resin 20 can be formed only by injecting the resin 20 into the case 50 in which the plurality of optical fibers 11 positioned in the middle portion 10M of the optical fiber cable 10 are accommodated.

In addition, according to the manufacturing method of an optical fiber cable of the second example, the case 50 is cut together with the plurality of optical fibers 11 to be divided into the first case divided body 56 and the second case divided body 57 in the dividing step. Furthermore, in the connecting step, the divided optical fibers 11 in the dividing step are positioned relative to each other by positioning the first case divided body 56 and the second case divided body 57 relative to each other. As a result, the two case divided bodies 56 and 57 can be used to easily position the divided optical fibers 11 relative to each other.

Figure 14:
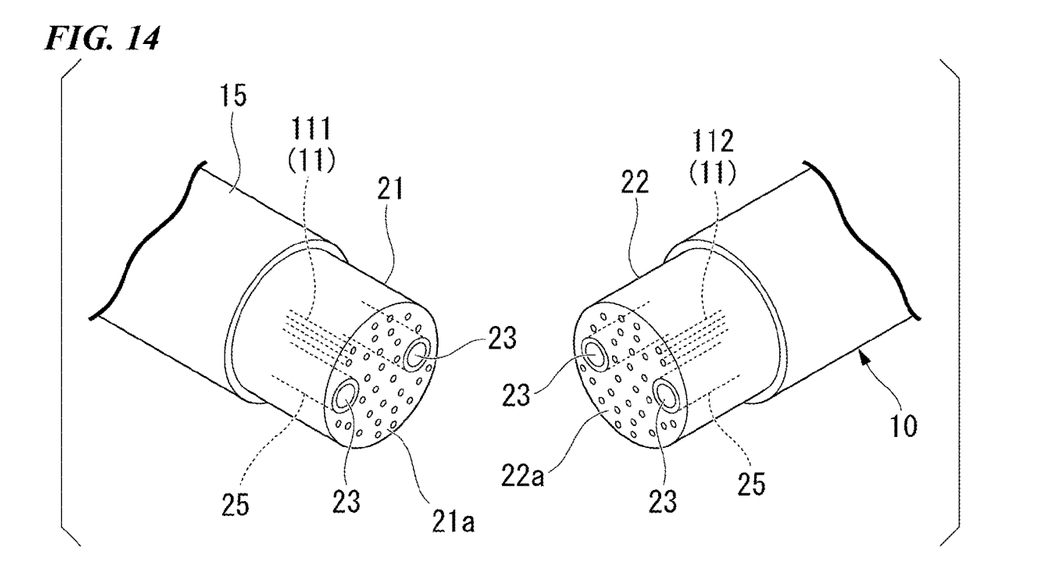
FIG. 14 is a perspective view showing an optical fiber cable connection structure according to one or more embodiments.

In the connecting step of the manufacturing method of the second example, it is not limited to using the case 50 (first and second case divided bodies 56 and 57) for the positioning of the divided optical fibers 11 in the dividing step, and for example, as shown in FIG. 14, a plurality of guide holes 23 (two in the shown example) that are open to the respective end surfaces 21a and 22a of the first and second resin portions 21 and 22 may be used. The positions of the plurality of guide holes 23 in the end surface 21a of the first resin portion 21 correspond to the positions of the plurality of guide holes 23 in the end surface 22a of the second resin portion 22. In the connecting step, the same guide pin (not shown) may be inserted into the guide hole 23 of the first resin portion 21 and the guide hole 23 of the second resin portion 22 corresponding to each other. As a result, it is possible to easily position the divided optical fibers 11 relative to each other.

Figure 15:
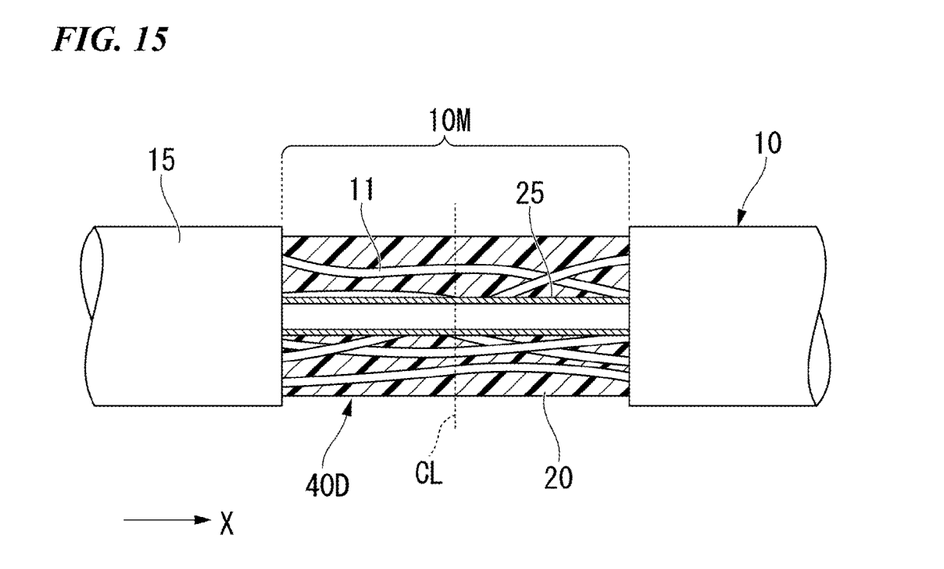
FIG. 15 is a view schematically showing a manufacturing method of an optical fiber cable according to one or more embodiments.

The guide holes 23 of the first and second resin portions 21 and 22 can be formed by using, for example, a tubular member 25 as shown in FIG. 15. In order to form the guide holes 23 (see FIG. 14) of the first and second resin portions 21 and 22, first, the tubular member 25 extending in the axial direction X is arranged in the middle portion 10M before the plurality of optical fibers 11 positioned in the middle portion 10M of the optical fiber cable 10 are fixed with the resin 20 in the fixing step. Next, the fixing step in which the tubular member 25 is fixed with the resin 20 together with the plurality of optical fibers 11 to form a fixing portion 40D is implemented such that the resin 20 is not put into the tubular member 25. Thereafter, the dividing step in which the fixing portion 40D (the plurality of optical fibers 11, the resin 20, and the tubular member 25) is cut at the cutting position CL is implemented. As a result, as shown in FIG. 14, an inner space of the tubular member 25 is open to each of the end surfaces 21a and 22a of the first and second resin portions 21 and 22. That is, a space inside the tubular member 25 serves as the guide hole 23.

Third Example

Next, a connection structure and manufacturing method of an optical fiber cable according to a third example of the present invention will be described mainly with reference to FIGS. 16 to 19. In the following description, configurations in the description hereafter that are the same as those already described are given the same reference signs, and repeated descriptions thereof will be omitted.

Figure 16:
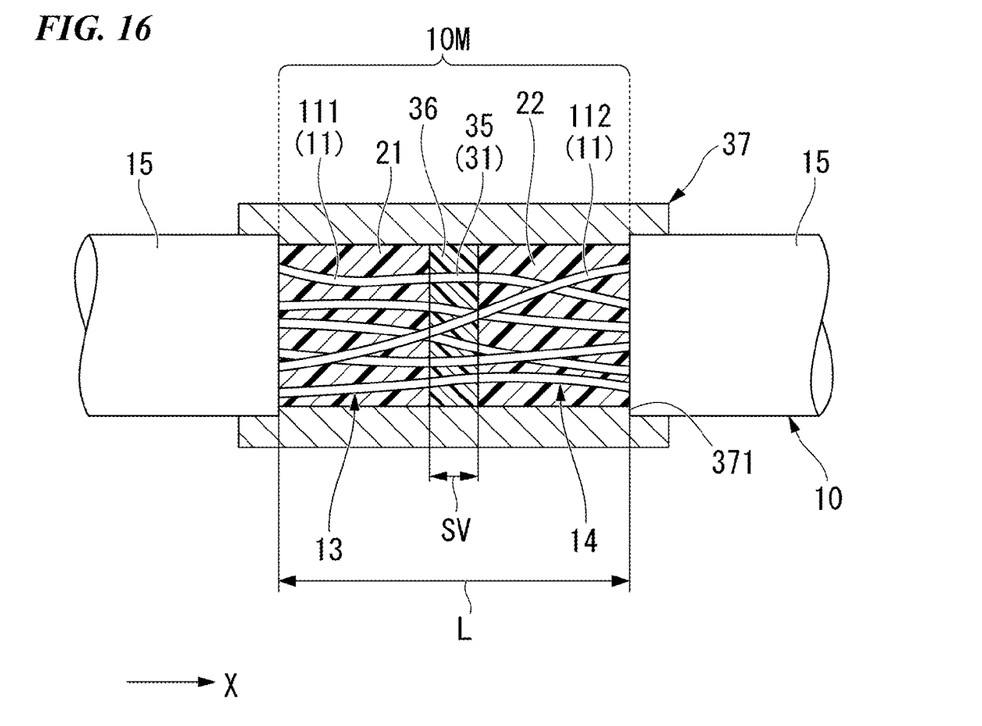
FIG. 16 is a view schematically showing an optical fiber cable connection structure according to one or more embodiments.

As shown in FIG. 16, the optical fiber cable connection structure of the third example includes an optical fiber cable 10 divided at a middle portion 10M in a longitudinal direction thereof, a first resin portion 21, a second resin portion 22, and an optical path 31, as in the first example.

However, the optical path 31 of the third example refers to a plurality of self-assembled optical waveguides 35. In addition, the optical fiber cable connection structure according to the third example further includes a holding resin portion 36 and a holding tube portion 37.

The self-assembled optical waveguide 35 is formed of a photocurable resin. Examples of the photocurable resin include epoxy-based materials, acrylic-based materials, polyimide-based materials, silicone-based materials, and organic/inorganic hybrid materials. The plurality of self-assembled optical waveguides 35 each extend from cut surfaces 111a and 112a (see FIG. 2) of the first bundle 13 and the second bundle 14, and individually connect together the divided plurality of optical fibers 11 to each other. Specifically, the plurality of self-assembled optical waveguides 35 individually connect together the plurality of first optical fibers 111 and the plurality of second optical fibers 112.

Each self-assembled optical waveguide 35 guides light between the first optical fiber 111 and the second optical fiber 112 connected thereby. That is, the plurality of self-assembled optical waveguides 35 individually and optically connect together the plurality of first optical fibers 111 and the plurality of second optical fibers 112.

In addition, the plurality of self-assembled optical waveguides 35 are interposed between the cut surfaces 111a of the first bundle 13 and the cut surfaces 112a of the second bundle 14. Furthermore, the length of the self-assembled optical waveguide 35 in an axial direction X corresponds to the length of a shaving margin SV. As a result, the self-assembled optical waveguide 35 holds a space between the first bundle 13 and the second bundle 14 in the axial direction X at the length of the shaving margin SV.

The holding resin portion 36 fixes the plurality of self-assembled optical waveguides 35 integrally, and reinforces the plurality of self-assembled optical waveguides 35. The holding resin portion 36 is disposed to fill the self-assembled optical waveguide therein and to fill the space between an end surface 21a of the first resin portion 21 and an end surface 22a of the second resin portion 22 (see FIG. 2). A thickness of the holding resin portion 36 in the axial direction X corresponds to the length of the shaving margin SV. As a result, the holding resin portion 36 holds a space between the first bundle 13 and the second bundle 14 in the axial direction X together with the self-assembled optical waveguide 35 at the length of the shaving margin SV.

The holding resin portion 36 may be a resin through which the light does not pass, or may be an optical resin having light transmissive properties. When the holding resin portion 36 is the optical resin, a refractive index of the holding resin portion 36 is preferably lower than a refractive index of the self-assembled optical waveguide 35.

The holding tube portion 37 is formed in a tubular shape extending in the axial direction X. The holding tube portion 37 accommodates, inside thereof, the first bundle 13 and the first resin portion 21 which are fixed integrally, the second bundle 14 and the second resin portion 22 which are fixed integrally, and the plurality of self-assembled optical waveguides 35 and the holding resin portion 36.

The holding tube portion 37 is arranged in the middle portion 10M of the optical fiber cable 10. An inner peripheral portion 371 of the holding tube portion 37 is interposed between sheaths 15 positioned on both sides of the middle portion 10M in the axial direction X. In the axial direction X, the length L of the inner peripheral portion 371 of the holding tube portion 37 interposed between the sheaths 15 corresponds to the length between the sheaths 15 when the space between the first bundle 13 and the second bundle 14 is the length of the shaving margin SV (that is, the length of the middle portion 10M). That is, the holding tube portion 37 holds a space between the first bundle 13 and the second bundle 14 in the axial direction X together with the self-assembled optical waveguide 35 at the length of the shaving margin SV.

Next, a manufacturing method of an optical fiber cable according to the third example will be described with reference to FIGS. 17 to 19.

In the manufacturing method of an optical fiber cable according to the third example, a fixing step, a dividing step, and a connecting step are implemented in order, as in the first example. In addition, a sheath removing step as in the first example is implemented before the fixing step. A sheath removing step, a fixing step, and a dividing step of the third example are the same as those of the first example.

Figure 17:
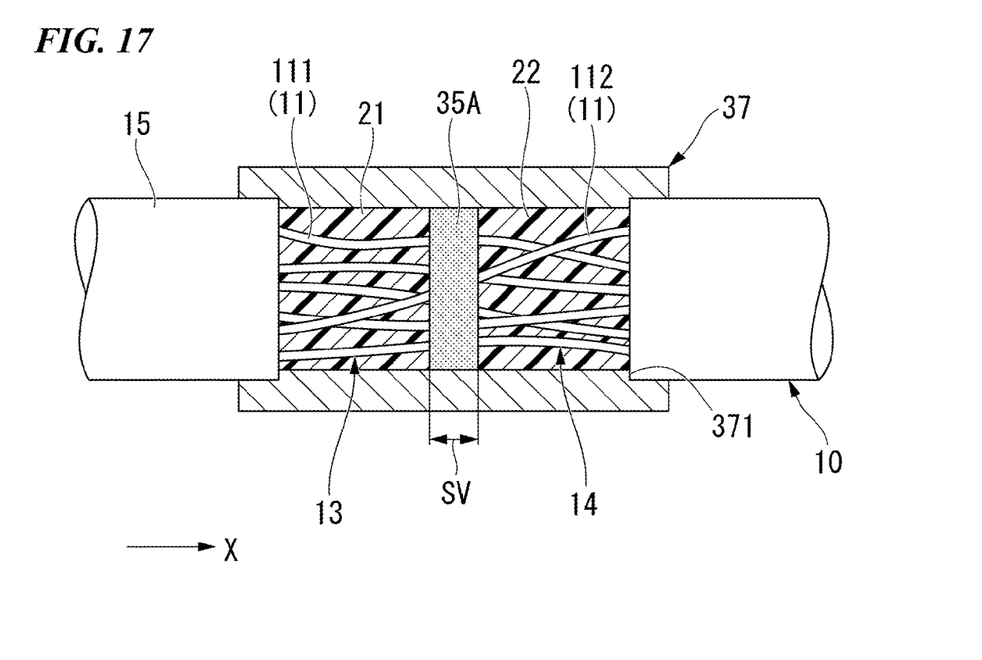
FIG. 17 is a view showing a manufacturing method of an optical fiber cable according to one or more embodiments.

In a connecting step of the third example, first, as shown in FIG. 17, a photocurable resin 35A that is not cured is filled between the first bundle 13 and the second bundle 14 in a state where the space between the first bundle 13 and the second bundle 14 is held at the space corresponding to the length of the shaving margin SV (filling step). Any method may be used to hold the space between the first bundle 13 and the second bundle 14 and to fill the photocurable resin 35A.

In the filling step of one or more embodiments, the inner peripheral portion 371 of the holding tube portion 37 is used to hold the space between the first bundle 13 and the second bundle 14 at the length of the shaving margin SV. Specifically, the first bundle 13 and the first resin portion 21, which are fixed integrally, and the second bundle 14 and the second resin portion 22, which are fixed integrally, are inserted into the holding tube portion 37 through openings on both sides of the holding tube portion 37. As a result, the inner peripheral portion 371 of the holding tube portion 37 holds the space between the first bundle 13 and the second bundle 14 at the length of the shaving margin SV. In addition, the holding tube portion 37 is used to position the divided plurality of optical fibers 11 relative to each other. The plurality of optical fibers 11 may be positioned using, for example, a guide hole 23 shown in FIG. 14.

In addition, in the filling step of one or more embodiments, the holding tube portion 37 is used to fill the photocurable resin 35A between the first bundle 13 and the second bundle 14. Specifically, the photocurable resin 35A is filled between the first bundle 13 and the second bundle 14 by injecting the photocurable resin 35A into the holding tube portion 37 through an injection port (not shown) formed in the holding tube portion 37.

Figure 18:
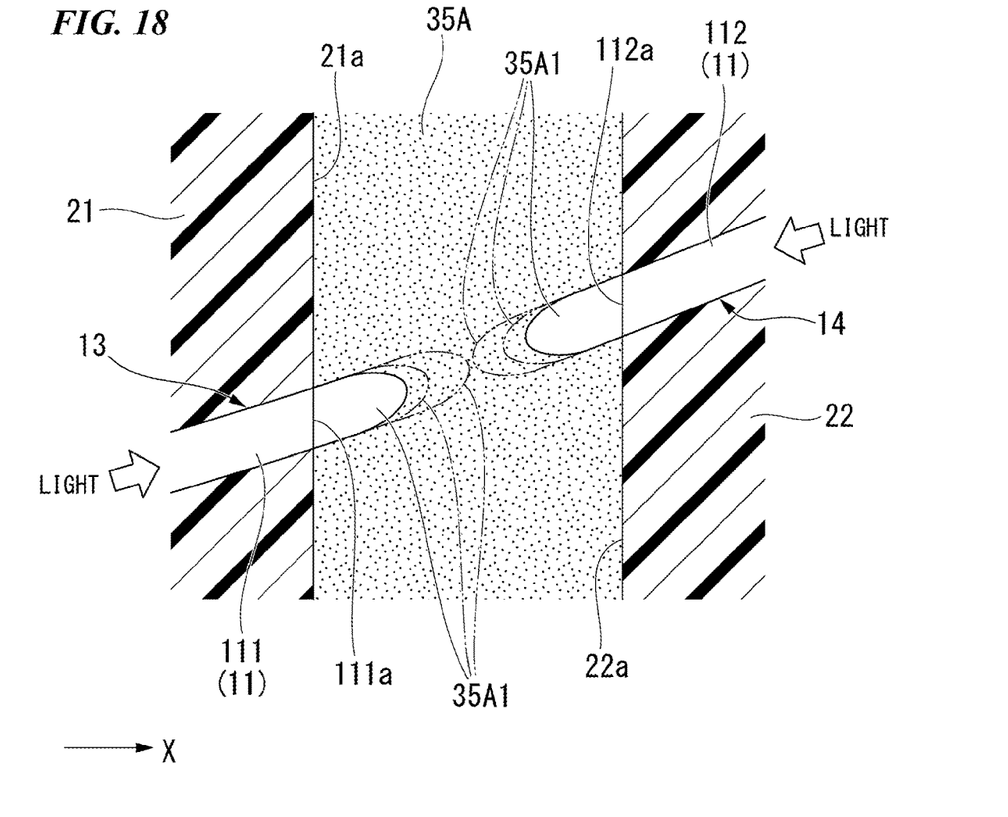
FIG. 18 is a view showing a process of forming a self-assembled optical waveguide in the manufacturing method of an optical fiber cable according to one or more embodiments.
Figure 19:
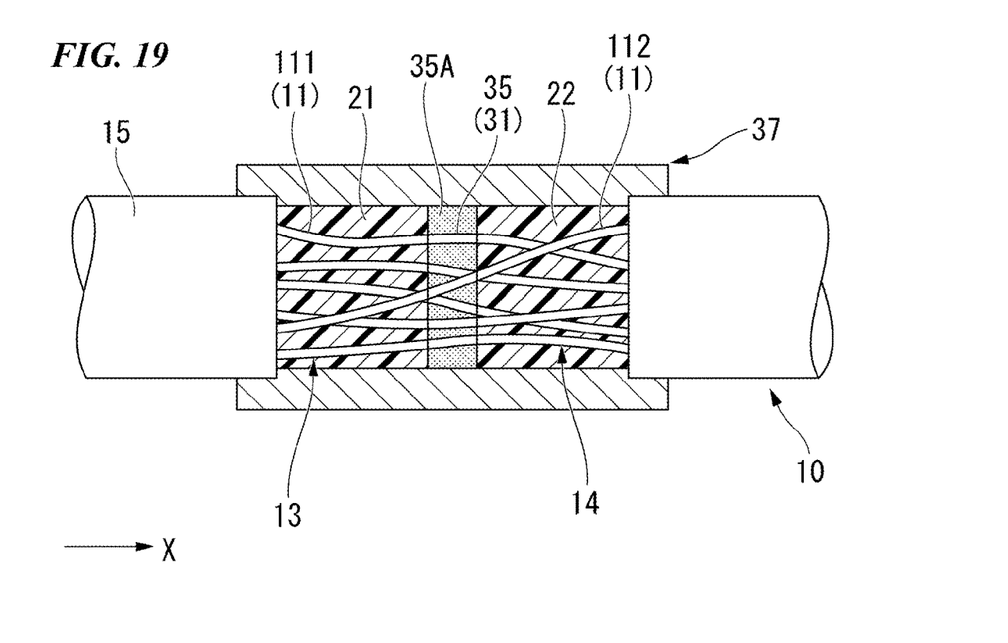
FIG. 19 is a view showing a step subsequent to FIGS. 17 and 18.

After the filling step, as shown in FIGS. 18 and 19, a self-assembled optical waveguide 35 for connecting the optical fiber 11 of the first bundle 13 (first optical fiber 111) and the optical fiber 11 of the second bundle 14 (second optical fiber 112) to each other is formed (optical waveguide forming step).

In the optical waveguide forming step, as shown in FIG. 18, the light passes through the corresponding first optical fiber 111 and second optical fiber 112, and the light is launched from the cut surfaces 111a and 112a of the corresponding first optical fiber 111 and second optical fiber 112 to the photocurable resin 35A. The light cures the photocurable resin 35A. A part where the photocurable resin 35A is cured (cured part 35A1) extends in a direction in which the light travels from each of the cut surfaces 111a and 112a of the first optical fiber 111 and the second optical fiber 112 (upper right direction or lower left direction in FIG. 18). Cured parts 35A1 of the photocurable resin 35A each extending from the cut surface 111a of the first optical fiber 111 and the cut surface 112a of the second optical fiber 112 are connected to each other, such that, as shown in FIG. 19, a self-assembled optical waveguide 35 is formed. As a result, the first optical fiber 111 and the second optical fiber 112 are optically connected through the self-assembled optical waveguide 35, thereby completing the connecting step.

After the connecting step, a part where the photocurable resin 35A is not cured is discharged from the space between the first bundle 13 and the second bundle 14 (resin discharge step). Thereafter, as shown in FIG. 16, the holding resin portion 36 that integrally fixes the plurality of self-assembled optical waveguides 35 is formed (resin portion forming step). In the resin portion forming step, a liquid resin is injected between the first bundle 13 (first resin portion 21) and the second bundle 14 (second resin portion 22) through an injection port of the holding tube portion 37 to cure the resin, thereby forming the holding resin portion 36.

As described above, the manufacturing method of an optical fiber cable according to one or more embodiments is completed.

According to the third example described above, the same effects as those of the first example are obtained.

In addition, in the optical fiber cable connection structure of the third example, the divided plurality of optical fibers 11 are individually and optically connected to each other by the plurality of self-assembled optical waveguides 35. As a result, it is possible to improve coupling efficiency of light signals transmitted between the divided optical fibers 11.

Furthermore, according to the manufacturing method of an optical fiber cable of the third example, the self-assembled optical waveguide 35 that connects the first optical fiber 111 and the second optical fiber 112 to each other can be formed only by launching the light from the first optical fiber 111 and the second optical fiber 112 toward the photocurable resin 35A. That is, the divided optical fibers 11 can be easily and optically connected by the self-assembled optical waveguide 35.

In addition, in the manufacturing method of an optical fiber cable of the third example, even if the space between the cut surfaces 111a of the first optical fiber 111 and the cut surfaces 112a of the second optical fiber 112 in the axial direction X is not set with high accuracy, that is, even if the space is slightly different from the length of the shaving margin SV, the divided optical fibers 11 can be optically connected by the self-assembled optical waveguide 35.

The optical fiber cable connection structure of the third example may include, for example, at least one of the holding resin portion 36 and the holding tube portion 37. For example, when the optical fiber cable connection structure does not include the holding tube portion 37, the holding tube portion 37 may be removed after forming the holding resin portion 36 in the manufacturing method.

In the manufacturing method of an optical fiber cable of the third example, in the optical waveguide forming step, for example, the light may pass through only one of the first and second optical fibers 111 and 112, and the light may be launched from one cut surface of the first and second optical fibers 111 and 112 to the photocurable resin 35A. In this case, the cured part 35A1 of the photocurable resin 35A extends from the one cut surface toward the other cut surface. The cured part 35A1 reaches the other cut surface, thereby forming the self-assembled optical waveguide 35. As a result, the first and second optical fibers 111 and 112 are optically connected through the self-assembled optical waveguide 35.

Although the present invention has been described in detail, the present invention is not limited to the embodiments described above, and various modifications may be made without departing from the gist of the present invention.

The present invention is not limited to the connection between the optical fiber cables 10 outdoors, and for example, the connection between the optical fiber cable 10 extending from a server arranged indoors and the optical fiber cable 10 installed outdoors may be applied.

In one or more embodiments, the cut surfaces 111a of the first bundle 13 (optical fiber 111) and the cut surfaces 112a of the second bundle 14 (optical fiber 112) are not limited to being orthogonal to the axial direction X (longitudinal direction of the optical fiber cable), and for example, may be inclined with respect to the axial direction X. In this case, light signals propagating through the optical fibers 111 and 112 and the optical path 31 in a predetermined direction can be suppressed and prevented from being reflected at each of the cut surfaces 111a and 112a of the optical fibers 111 and 112, and returned in the opposite direction. Inclination angles of the cut surfaces 111a and 112a of the optical fibers 111 and 112 with respect to a plane perpendicular to the axial direction X may be, for example, 3 degrees to 15 degrees.

In the manufacturing method of an optical fiber cable of one or more embodiments, in the fixing step of fixing the plurality of optical fibers 11 with a resin, for example, the plurality of optical fibers 11 may be fixed by tightening the plurality of optical fibers 11 with a spiral tube or a heat-shrinkable tube made of resin. In addition, in the fixing step, for example, the plurality of optical fibers 11 may be fixed using a pair of half tubes that is to be a resin tube body by being assembling. For example, in a state where the plurality of optical fibers 11 are pinched using the pair of half tubes, the plurality of optical fibers 11 may be fixed by fixing the pair of half tubes to each other through latching or screwing.

In the manufacturing method of an optical fiber cable of one or more embodiments, after the sheath removing step and before the fixing step, a coating removing step of removing coatings (not shown) of the plurality of optical fibers 11 exposed to the outside at the middle portion 10M may or may not be implemented.

When the coating removing step is implemented, since a fiber body (glass part) of the optical fiber 11 is exposed, the fiber body can be directly fixed with a resin in the fixing step. Therefore, after the dividing step, it is possible to suppress or prevent the shifting of the plurality of first optical fibers 111 from each other and the shifting of the plurality of second optical fibers 112 from each other.

On the other hand, when the coating removing step is not implemented, the fiber body of the optical fiber 11 is protected by the coating. Therefore, it is possible to suppress or prevent the fiber body from being damaged in a process of manufacturing the optical fiber cable, such as the fixing step or the dividing step. As a result, it is possible to improve mechanical reliability of the manufactured optical fiber cable.

The type of optical fiber of the optical fiber cable employed in one or more embodiments may be, but not limited thereto, a single-mode fiber, a multi-mode fiber, a photonic crystal fiber, a multi-core fiber, or the like.

In addition, a material of the optical fiber employed in one or more embodiments may be, but not limited thereto, a silica optical fiber, a plastic optical fiber, or the like.

In addition, the optical fiber cable employed in one or more embodiments may have only one type of optical fiber, or may have a plurality of types of optical fiber.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10: Optical fiber cable
10M: Middle portion
11: Optical fiber
13: First bundle
14: Second bundle
21: First resin portion (first fixing portion)
22: Second resin portion (second fixing portion)
31: Optical path
331, 332, 333: Optical resin
35: Self-assembled optical waveguide
35A: Photocurable resin
40, 40D: Fixing portion
50: Case
56: First case divided body
57: Second case divided body
111a: Cut surface of first bundle 13
112a: Cut surface of second bundle 14
X: Axial direction (longitudinal direction of optical fiber cable)

The invention claimed is:
1. An optical fiber cable connection structure comprising:
optical fibers divided into a first bundle and a second bundle in a middle portion of an optical fiber cable in a longitudinal direction of the optical fiber cable;
a first fixing portion that integrally fixes the optical fibers of the first bundle in the middle portion;
a second fixing portion that integrally fixes the optical fibers of the second bundle in the middle portion; and
an optical path that is disposed between the first bundle and the second bundle, holds a space between the first bundle and the second bundle in the longitudinal direction, and optically connects the divided optical fibers to each other, wherein at least one of the optical fibers of one or both of the first bundle and the second bundle extends in an oblique direction with respect to the longitudinal direction, the optical fibers of the first bundle are embedded in a resin included in the first fixing portion, and the optical fibers of the second bundle are embedded in a resin included in the second fixing portion.

2. The optical fiber cable connection structure according to claim 1, wherein the optical path includes an optical resin having light transmissive properties and disposed on at least one of cut surfaces of the first bundle and cut surfaces of the second bundle.

3. The optical fiber cable connection structure according to claim 1, wherein the optical path includes self-assembled optical waveguides including a photocurable resin that individually connects the divided optical fibers, and the divided optical fibers extend from cut surfaces of the first bundle and the second bundle.

4. A manufacturing method of an optical fiber cable, comprising:

fixing optical fibers with a resin to form a fixing portion in a middle portion of an optical fiber cable in a longitudinal direction of the optical fiber cable, wherein at least one of the fixed optical fibers extends in an oblique direction with respect to the longitudinal direction;

cutting the optical fibers in the fixing portion to divide the optical fibers into a first bundle and a second bundle;

optically connecting the divided optical fibers to each other in a state where a space between the first bundle and the second bundle corresponds to a length of a shaving margin in cutting the optical fibers; and in fixing the optical fibers, forming the fixing portion by accommodating the middle portion in a case and injecting the resin into the case.

5. The manufacturing method according to claim 4, further comprising:

in optically connecting the divided optical fibers, disposing an optical resin having light transmissive properties on at least one of cut surfaces of the first bundle and cut surfaces of the second bundle, wherein a thickness of the optical resin interposed between the cut surfaces of the first bundle and the cut surfaces of the second bundle corresponds to the length of the shaving margin.

6. The manufacturing method according to claim 5, further comprising:

in fixing the optical fibers, forming the fixing portion by accommodating the middle portion in a case and injecting the resin into the case;

in cutting the optical fibers, dividing the case into a first case divided body integrally fixed to the first bundle and a second case divided body integrally fixed to the second bundle by cutting the case together with the optical fibers; and in optically connecting the divided optical fibers, positioning the divided optical fibers by positioning the first case divided body and the second case divided body.

7. The manufacturing method according to claim 4, further comprising in optically connecting the divided optical fibers:

filling a portion between the first bundle and the second bundle with a photocurable resin in a state where the space corresponds to the length of the shaving margin; and forming a self-assembled optical waveguide that connects together the optical fibers of the first bundle and the optical fibers of the second bundle by allowing light to pass through at least one of the optical fibers of the first bundle and the optical fibers of the second bundle and launching the light toward the photocurable resin to cure the photocurable resin.

8. The manufacturing method according to claim 7, further comprising:

in fixing the optical fibers, forming the fixing portion by accommodating the middle portion in a case and injecting the resin into the case;

in cutting the optical fibers, dividing the case into a first case divided body integrally fixed to the first bundle and a second case divided body integrally fixed to the second bundle by cutting the case together with the optical fibers; and in optically connecting the divided optical fibers, positioning the divided optical fibers by positioning the first case divided body and the second case divided body.

9. The manufacturing method according to claim 4, further comprising:

in cutting the optical fibers, dividing the case into a first case divided body integrally fixed to the first bundle and a second case divided body integrally fixed to the second bundle by cutting the case together with the optical fibers; and in optically connecting the divided optical fibers, positioning the divided optical fibers by positioning the first case divided body and the second case divided body.

* * * * *